(12) United States Patent
Hogo

(10) Patent No.: US 10,062,338 B2
(45) Date of Patent: Aug. 28, 2018

(54) PHOTOSENSOR DEVICE AND IMAGE DISPLAY DEVICE

(71) Applicant: EIZO Corporation, Ishikawa (JP)

(72) Inventor: Hidekazu Hogo, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/303,795

(22) PCT Filed: Apr. 2, 2015

(86) PCT No.: PCT/JP2015/060430
§ 371 (c)(1),
(2) Date: Oct. 13, 2016

(87) PCT Pub. No.: WO2015/159718
PCT Pub. Date: Oct. 22, 2015

(65) Prior Publication Data
US 2017/0047024 A1  Feb. 16, 2017

(30) Foreign Application Priority Data
Apr. 15, 2014  (JP) .................... 2014-083570

(51) Int. Cl.
*G09G 5/00* (2006.01)
*G09G 3/36* (2006.01)
(Continued)

(52) U.S. Cl.
CPC ............. *G09G 3/36* (2013.01); *G06F 1/1601* (2013.01); *G06F 1/1607* (2013.01);
(Continued)

(58) Field of Classification Search
CPC .................. G09G 3/36; G09G 3/2003; G09G 2320/0626; G09G 2320/0666;
(Continued)

(56) References Cited

U.S. PATENT DOCUMENTS

| 2005/0190136 A1 | 9/2005 | Edelbrock |
| 2007/0091127 A1* | 4/2007 | Edelbrock ............... G01J 1/02 345/690 |

(Continued)

FOREIGN PATENT DOCUMENTS

| JP | 2005-208548 A | 4/2005 |
| JP | 4805832 A | 4/2007 |

(Continued)

OTHER PUBLICATIONS

Extended European Search Report dated Mar. 30, 2017, in connection with corresponding EP Application No. 15779950.3 (12 pgs.).

(Continued)

*Primary Examiner* — Mark Edwards
(74) *Attorney, Agent, or Firm* — Maier & Maier, PLLC

(57) ABSTRACT

Provided is a photosensor device that even when the width and thickness of a bezel are reduced, can cause a sensor unit to smoothly exit and enter the bezel. Using drive means, a photosensor device causes a sensor unit to perform multiple rotation operations. Thus, the sensor unit is allowed to approach a display screen of an image display panel for a measurement and to be stored in a bezel after the measurement.

9 Claims, 10 Drawing Sheets

(51) Int. Cl.
*H04N 5/64* (2006.01)
*G09G 3/20* (2006.01)
*G06F 1/16* (2006.01)

(52) U.S. Cl.
CPC ............ *G09G 3/2003* (2013.01); *H04N 5/64* (2013.01); *G09G 2320/0626* (2013.01); *G09G 2320/0666* (2013.01); *G09G 2320/0693* (2013.01); *G09G 2360/145* (2013.01)

(58) Field of Classification Search
CPC ...... G09G 2320/0693; G09G 2360/145; G06F 1/1601; G06F 1/1607; H04N 5/64
See application file for complete search history.

(56) References Cited

U.S. PATENT DOCUMENTS

| | | |
|---|---|---|
| 2008/0204437 A1 | 8/2008 | Jensen |
| 2013/0214141 A1 | 8/2013 | Hogo et al. |
| 2014/0091210 A1 | 4/2014 | Hogo et al. |

FOREIGN PATENT DOCUMENTS

| | | | | |
|---|---|---|---|---|
| JP | 2008-165083 | A | | 7/2008 |
| JP | 2011-022226 | A | | 2/2011 |
| JP | 4846051 | A | | 5/2012 |
| JP | 2012-150136 | A | | 8/2012 |
| JP | 2012-150213 | A | | 8/2012 |
| JP | 2012150136 | A | * | 8/2012 |
| JP | 4951711 | A | | 1/2013 |
| JP | 2014-048458 | A | | 3/2014 |
| WO | WO 2012172707 | A1 | * | 12/2012 ........... G06F 1/1601 |
| WO | 2013/102997 | A1 | | 7/2013 |

OTHER PUBLICATIONS

International Search Report dated Jun. 30, 2015 in corresponding Application No. PCT/JP2015/060430; 2 pgs.

* cited by examiner

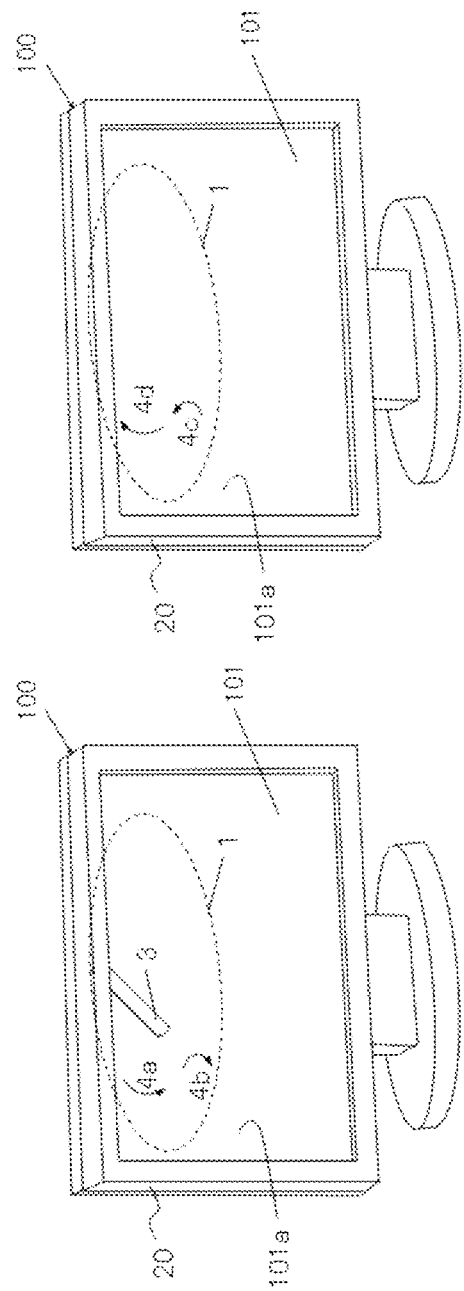

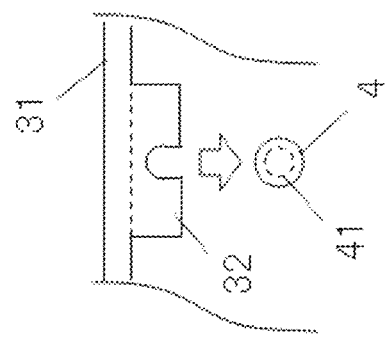
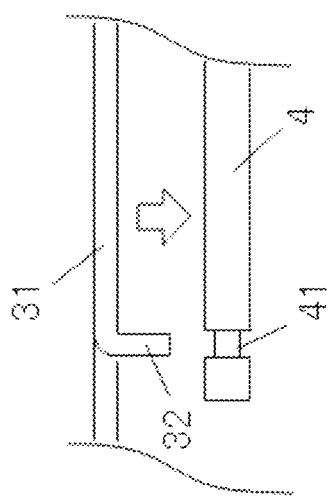

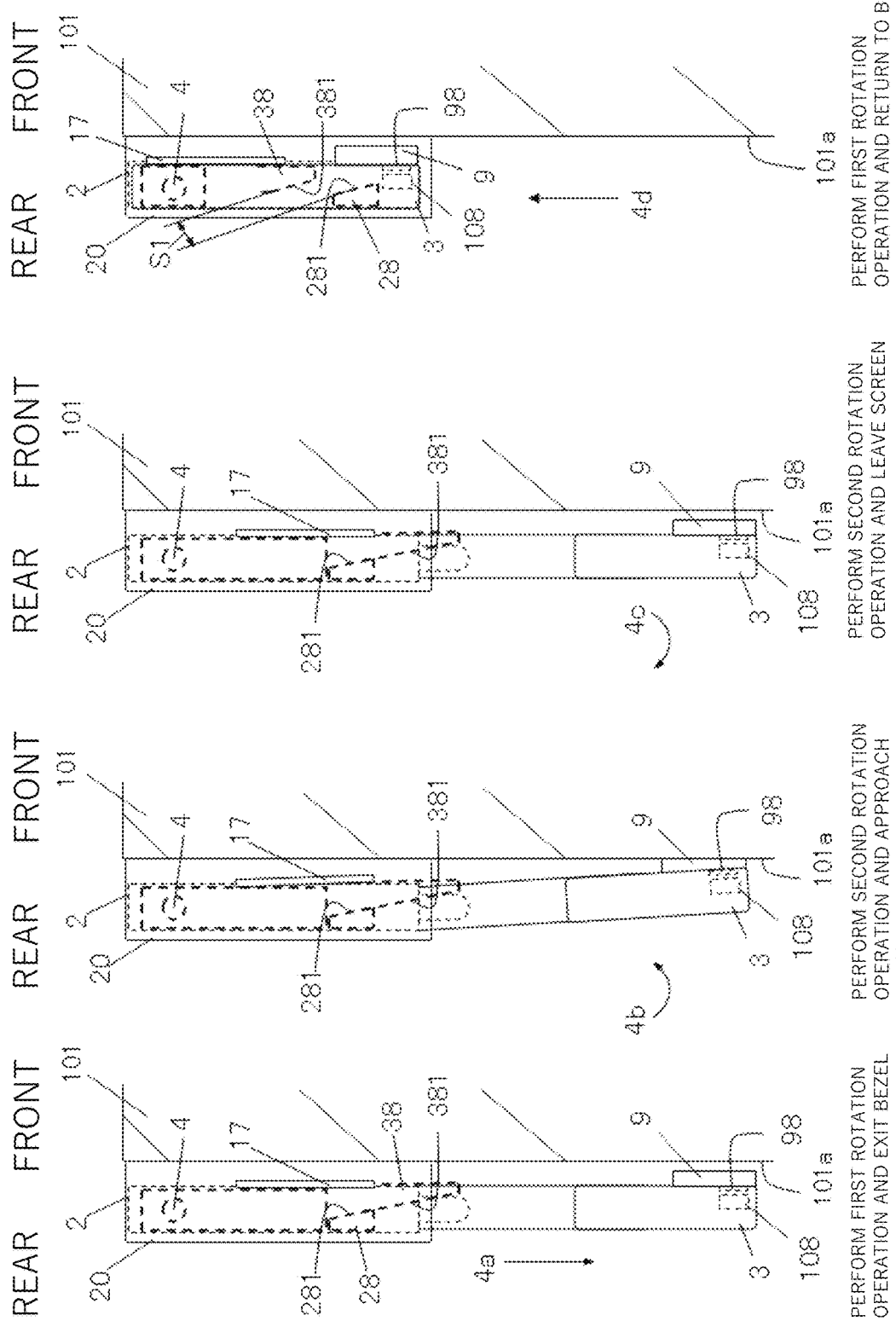

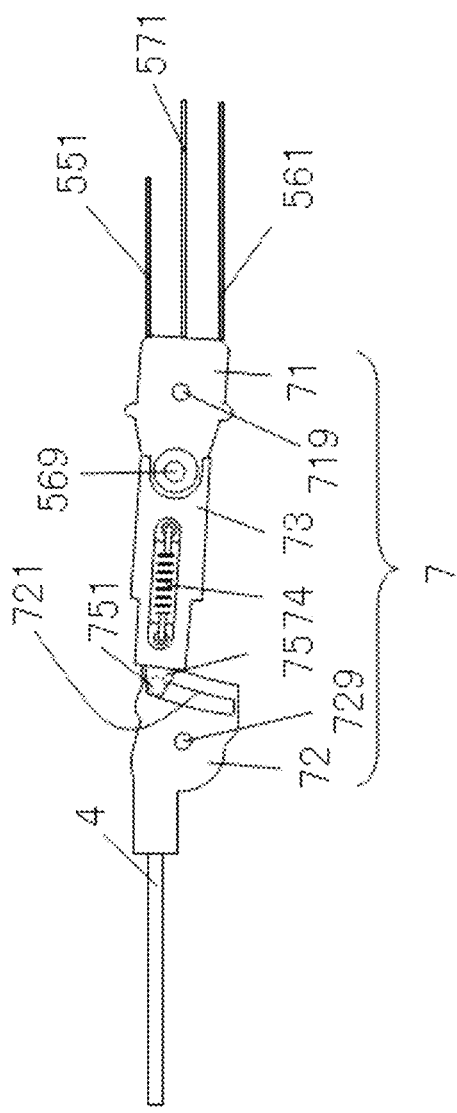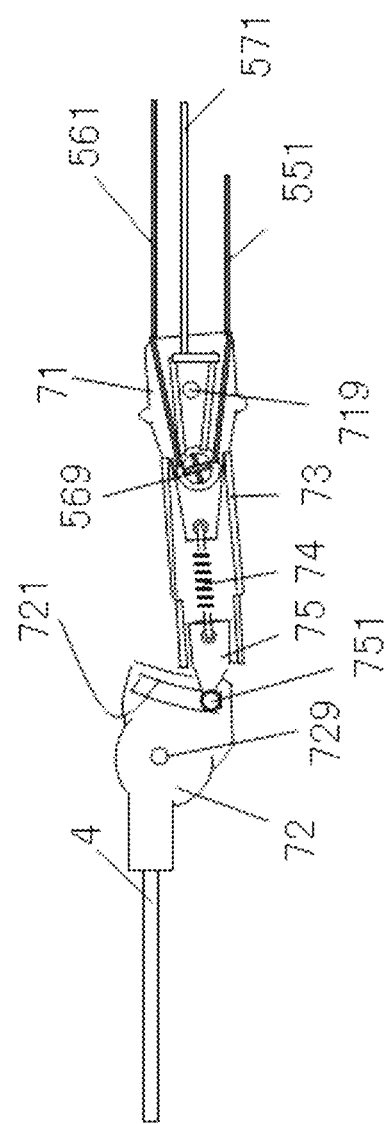
Fig 6A
Fig 6B

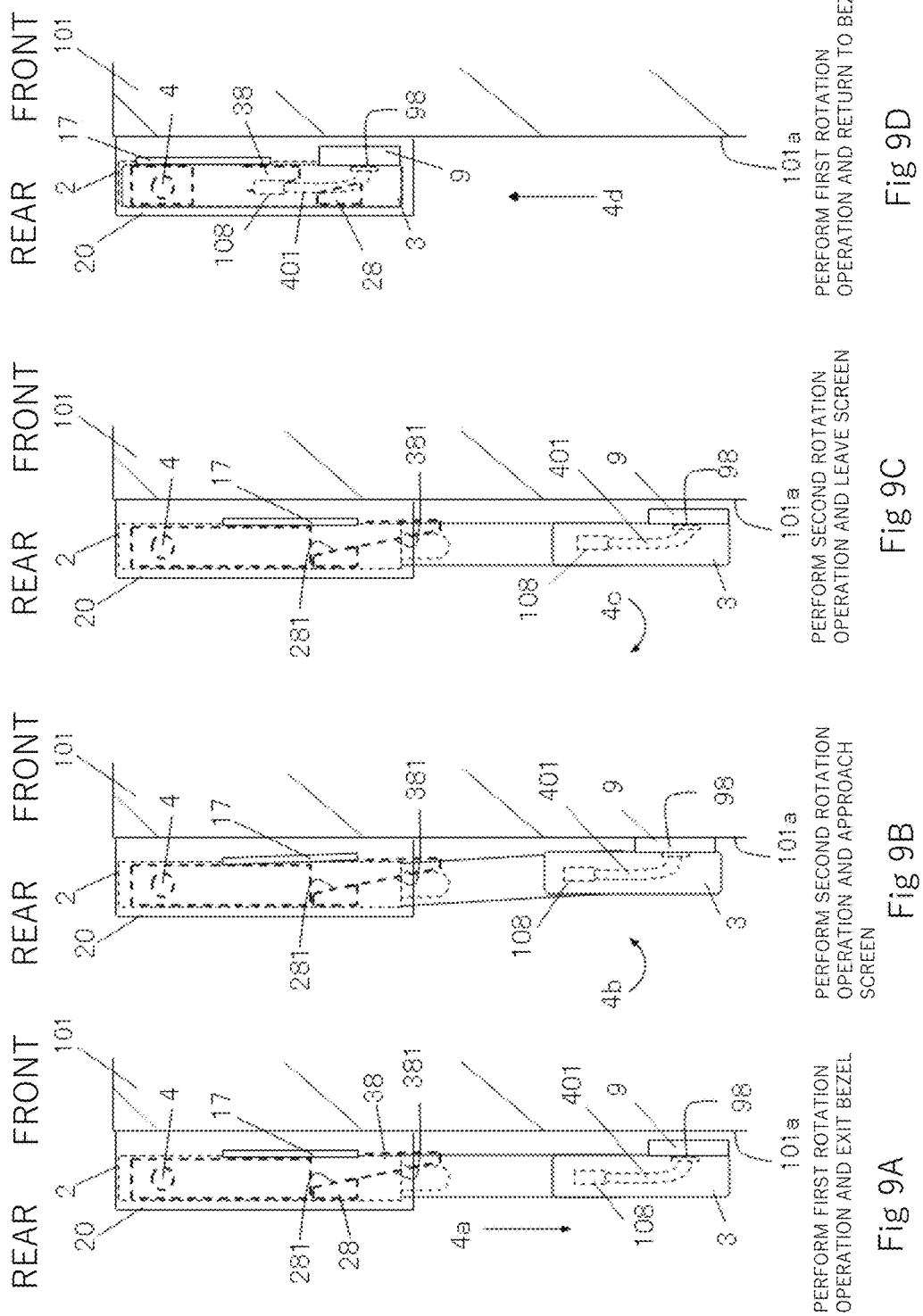

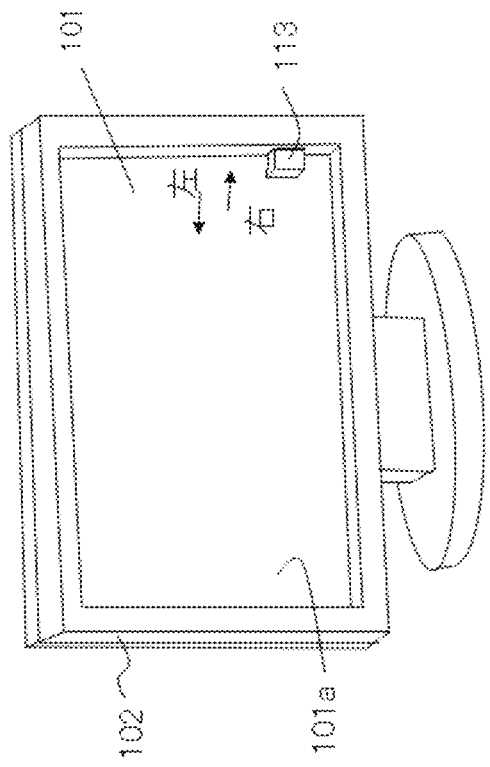

US 10,062,338 B2

PHOTOSENSOR DEVICE AND IMAGE DISPLAY DEVICE

TECHNICAL FIELD

The present invention relates to a photosensor device that measures the luminance, chromaticity, or the like of an image display panel, and an image display device including the photosensor device.

BACKGROUND ART

Liquid crystal monitors for image display are being used not only in offices or households but also at sites of various kinds of professional work, such as graphic design and medical care. In particular, high-end liquid crystal monitors are being used to display graphic design images or medical diagnostic images, since display of such images requires high-reproducibility, high-definition image quality. Further, high-end liquid crystal monitors that enhance the reproducibility of display images by measuring an optical property(s) of the liquid crystal screen, such as the luminance, chromaticity, or light quantity, using a photosensor and then performing monitor calibration on the basis of the measurement data obtained are currently commercially available.

A liquid crystal monitor consists of a liquid crystal display panel, a bezel surrounding the liquid crystal display panel, a backlight, electronic circuits, and the like. Currently, liquid crystal monitors including a sensor unit that performs monitor calibration using a photosensor are being commercialized.

Patent Literature 1 discloses a photosensor device: the photosensor device includes a body frame 102 disposed in a frame region around an image display panel, a photosensor used to measure the luminance, chromaticity, or the like of the image display panel, a sensor unit 113 containing the photosensor, a guide member that guides the sensor unit 113, and drive means that moves the sensor unit 113 to the measurement position; the sensor unit 113 is pushed out by the drive means and approaches a display screen 101 of the image display panel in such a manner to be guided by the guide member; and after a measurement, the sensor unit 113 is pulled back by the drive means so as to be stored in the frame 102 (FIG. 10).

Patent Literature 2 discloses a sensor unit actuation mechanism: the sensor unit actuation mechanism includes a frame disposed in a frame region around an object to be measured, a sensor unit on which a sensor for measuring a physical amount from the object to be measured is mounted, a guide member disposed in an x-direction to linearly move the sensor unit, a spring member that expands and contracts in a y-direction to return the sensor unit into the frame, and an actuator that expands and contracts in the y-direction to linearly move the sensor unit from within the frame to the measurement position in the x-direction; the x-direction and y-direction have a relationship where if the x-direction is the horizontal direction when the frame is seen from the front side, the y-direction is the vertical direction; and by energizing the actuator so that the actuator contracts against the resilience of the spring member, the sensor unit linearly moves from within the frame to the measurement position in the x-direction.

Patent Literature 3 discloses a flat display device: the flat display device includes a graphics processor; in calibration mode, the luminance of a white image displayed on a panel on the basis of an image signal corresponding to the maximum video level from an analog image signal is detected by a sensor disposed in a region that is not seen by the observer of the flat display; there is provided rotation means capable of rotating the sensor from the rest position to the luminance detection position approximately in parallel with the panel; and the graphics processor adjusts the gain in accordance with an change in the detected luminance, which is caused by a stepwise change in the gain by the graphics processor.

CITATION LIST

Patent Literature

Patent Literature 1: Japanese Patent No. 4951711
Patent Literature 2: Japanese Patent No. 4846051
Patent Literature 3: Japanese Patent No. 4805832

SUMMARY OF INVENTION

Technical Problem

As described above, monitors that display graphic design images, medical diagnostic images, or the like are required to have high-reproducibility, high-definition image quality. To meet such a requirement, it is necessary to accurately measure an optical property of the display screen, such as the luminance or chromaticity, using a photosensor in monitor calibration in such a manner that the photosensor is less likely to be affected by ambient external light. On the other hand, monitors are strongly required to have functionality or designability, such as the size or viewability of displayed images. Accordingly, the size of the bezel, such as the width or thickness, is required not to be limited by the shape of the photosensor unit. Also, a position close to the center, of the image display panel is preferred to a peripheral position thereof as the measurement region in which an optical property of the display screen, such as the luminance or chromaticity, is measured.

However, if an attempt is made to use a conventional photosensor device to measure an optical property of the display screen, such as the luminance or chromaticity, using a position close to the center, of the image display panel rather than a peripheral position thereof as the measurement region, the photosensor device would have a large size due to the structure thereof and thus affect the designability of liquid crystal display devices. Specifically, the photosensor devices of Patent Literatures 1 and 2 employ a system in which the sensor unit is pushed out obliquely and therefore an attempt to increase the stroke of the sensor unit would increase the width of the bezel that stores the sensor unit, thereby limiting the reduction of the bezel width. The photosensor device of Patent Literature 3 employs a system in which the sensor unit is rotated in parallel with the panel and therefore a clearance for preventing the sensor unit from contacting the panel must be provided, which would increase the thickness of the bezel that stores the sensor unit. Further, external light may enter through the clearance, which is always provided between the sensor unit and panel.

An object of the present invention is to provide a photosensor device that even when the width or thickness of the bezel are reduced, can cause a sensor unit to smoothly exit and enter the bezel.

Solution to Problem

A photosensor device of the present invention comprises a body frame disposed in a frame region around an image display panel, a photosensor used to measure luminance and/or chromaticity of the image display panel, a sensor unit for causing the photosensor to receive light, and drive means configured to move the sensor unit, wherein the sensor unit approaches a display screen of the image display panel by performing a plurality of rotation operations.

According to the present invention, even when the width or thickness of the bezel are reduced, the photosensor device can cause the sensor unit to smoothly exit and enter the bezel, compared to the conventional photosensor devices.

In the present invention, the sensor unit moves to a measurement region by performing a first rotation operation and approaches the display screen by performing a second rotation operation in a direction perpendicular to a direction of the first rotation operation.

According to the present invention, the single type of drive means allows the sensor unit to easily perform multiple rotation operations and to smoothly approach the display screen.

In the present invention, the sensor unit and the drive means are coupled through a shaft, and the shaft performs a first rotation operation in parallel with the display screen and then performs a second rotation operation perpendicularly to the display screen.

According to the present invention, when the shaft performs the first rotation operation, the sensor unit smoothly exits the bezel of the image display panel; when the shaft performs the second rotation operation, the sensor unit smoothly approaches the display screen.

In the present invention, the shaft and the drive means are coupled through a plurality of arms.

According to the present invention, the drive means allows the sensor unit to easily perform the multiple rotation operations.

In the present invention, a first slope formed on the sensor unit and a second slope formed on the body frame face and slide over each other.

According to the present invention, the sensor unit can smoothly approach the display screen of the image display panel.

The timing when the first slope and second slope start to face and slide over each other may be the time point when the first rotation operation starts, or may be a timing in the middle of the first rotation operation, or may be the time point when the first rotation operation is complete.

In the present invention, preferably, the sensor unit performs the first rotation operation along with the shaft approximately in parallel with the display screen of the image display panel and thus approaches the measurement region and then performs the second rotation operation around the shaft and thus approaches the display screen of the image display panel. According to the present invention, even when the thickness of the bezel is reduced, there is no possibility that the sensor unit will contact the bezel around the image display panel when approaching the display screen of the image display panel.

Preferably, the shaft is rotatably held by a predetermined holding member. According to the present invention, the single type of drive means allows the sensor unit to easily perform rotation operations in the multiple directions. In the present invention, the shaft is preferably rotatably held by the holding member disposed on the sensor unit. According to the present invention, even when the width and thickness of the bezel are reduced, the sensor unit is allowed to easily perform rotation operations in the multiple directions. For example, by press-fitting the shaft to the arms which are molded resin products, the structure of the body frame can be simplified. For example, by press-molding a metal sheet for shielding the photosensor, disposing the resulting metal sheet on the sensor unit, and causing a part of the metal sheet to serve as the holding member, the structure of the sensor unit can be simplified. As another configuration, the sensor unit may be provided with the function of the shaft. For example, by insert-molding the frame of the sensor unit and the shaft, the sensor unit and shaft are molded integrally. Use of this structure allows for a reduction in the number of components.

Preferably, the multiple arms for causing the sensor unit to perform the rotation operation are coupled together. Thus, the sensor unit is allowed to easily perform rotation operations in the multiple directions. In the present invention, preferably, a first arm and a second arm are coupled together to form the multiple arms, and the drive means operates the first arm, which then operates the second arm, which in turn operates the shaft fixed to the second arm. According to the present invention, the single type of drive means allows the sensor unit to easily perform rotation operations in the multiple directions.

Examples of the image display panel include liquid crystal display panels, organic electroluminescence display panels, and plasma display panels.

In the present invention, the photosensor is contained in the sensor unit, and the sensor unit has, on a side thereof facing the display screen, a lighting window for causing the photosensor to receive light and a shading member surrounding the lighting window and disposed in such a manner that light from the display screen is received by the photosensor. During a measurement, the shading member is in contact with the display screen of the image display panel, and after the measurement, the shading member leaves the display screen.

According to the present invention, during a measurement, the photosensor easily accurately measures light from the display screen in such a manner to be insusceptible to ambient external light. After the measurement, the sensor unit leaves the display screen without applying unnecessary external force to the image display panel.

Examples of the drive means include actuators which convert electric energy into mechanical power to drive the load. More specific examples include motors, solenoids, actuators using a piezoelectric element or electrostriction element, and actuators using a shape-memory alloy.

The present invention may be configured as follows: the sensor unit and guide member are disposed in the x-direction; a return spring that expands and contracts in the y-direction and an actuator that expands and contracts in the y-direction are provided; and by energizing the actuator so that it contracts against the resilience of the return spring, or by energizing the actuator so that it contracts and thus by causing the return spring to work, the sensor unit is moved from within the frame to the measurement position in the x-direction. According to the present invention, use of force generated by the contraction of the actuator in the y-direction allows the sensor unit to linearly move in the x-direction. This reduces the loss of stroke displacement and allows the sensor unit to smoothly exit and enter the bezel. In the present specification, the x-direction and y-direction have a relationship where if the x-direction is the vertical direction when the frame is seen from the front side, the y-direction is the horizontal direction or a relationship where if the x-direction is the horizontal direction when the frame is seen from the front side, the y-direction is the vertical direction. As used herein, the x-direction is defined as a direction whose angle is in a range of 45° to 135° or −45° to −135° when the y-direction is, for example, the horizontal direction and has an angle of 0°. Alternatively, the x-direction is defined as a direction whose angle is in a range of −45° to 45° or −135° to −225° when the y-direction is, for example, the vertical direction and has an angle of 90°.

Examples of the return spring include extension springs and pressing springs, and examples of the shape thereof include coil shapes, spiral shapes, and string shapes. The return spring is preferably a coiled extension spring. Use of a coiled extension spring allows a long stroke of resilience to be set, making it easy to increase the stroke of the sensor unit.

The actuator refers to an actuator that contracts against the resilience of the spring member when energized. Examples of the actuator include shape-memory alloy actuators, electrostriction actuators, and examples of the shape thereof include wire shapes, sheet shapes, coil shapes, spiral shapes, cylindrical shapes, and prismatic shapes. Sheet- and wire-shaped actuators can be disposed with a high degree of freedom even in a thin, narrow place. The type of the current to be passed through the actuator, that is, direct current or alternating current is selected in accordance with the characteristics of the actuator.

Preferably, the actuator used as the drive means of the present invention is a shape-memory alloy wire which generates heat and thus contracts when energized.

Examples of the material for the shape-memory alloy wire include titanium-nickel alloys and iron-manganese-silicon alloys. Examples of the shape of the shape-memory alloy wire include solid wires, stranded wires, and coil or spring wires. A shape-memory alloy wire having a larger diameter can generate a greater contraction force but requires larger energizing current and is less responsive when cooled. In contrast, a shape-memory alloy wire having a smaller diameter generates a smaller contraction force but requires smaller energizing current and is more responsive. The diameter of the shape-memory alloy wire is set to a range of, for example, 0.05 to 0.5 mm. The temperature around the monitor screen of the operating image display device may increase from room temperature to around 50° C. For this reason, to prevent the shape-memory alloy wire from malfunctioning due to the temperature, it is necessary to select a shape-memory alloy wire which, when energized, generates Joule heat having a temperature sufficiently higher than that around the monitor screen. More specifically, it is necessary to select a shape-memory alloy which is actuated at a temperature of 60° C. or more when energized. A shape-memory alloy which contracts at a temperature of about 70° C. and expands at a temperature of about 60° C. is practical. By setting the actuation temperature at which the shape-memory alloy wire contracts or expands to a higher temperature, on the actuation principle, the shape-memory alloy wire can be actuated stably with higher reproducibility.

The drive means of the present invention is not limited to the shape-memory alloy wire and may be a DC motor, solenoid, or the like. For example, by combining a wire, a pulley, and a DC motor (or solenoid) together and winding the wire around the pulley so that the wire apparently contract or pulling out the wire from the pulley so that the wire apparently expands, the wire can be actuated in a similar manner to the shape-memory alloy wire.

The present invention may be configured as follows: a rotation member having a shaft coupled to the frame is disposed as a balance member; an end of the actuator (the shape-memory alloy wire) is fixed to an end of the rotation member; and the rotation member is rotated when pulled. In this configuration, to make a measurement using the sensor, the actuator is energized to rotate the rotation member, thereby causing the sensor unit to move to the measurement position; during the measurement using the sensor, the energization is stopped.

The present invention may also be configured as follows: the actuator is defined as a first actuator; a second actuator that has an end fixed to a balance member (a rotation member) and that when energized, contracts and thus causes the balance member to start to rotate in the reverse direction is disposed in the y-direction; the sensor unit is linearly moved from within the frame to the measurement position in the x-direction by energizing the first actuator without energizing the second actuator; and after a measurement using the sensor, the sensor unit is returned from the measurement position to the original position by energizing the second actuator without energizing the first actuator. According to this configuration, the sensor unit can be moved to the measurement position by energizing the first actuator; on the other hand, the sensor unit can be returned to its original position by energizing the second actuator. These actuators are energized only when moving the sensor unit. In the other time periods, that is, in the time period in which the sensor unit is held in the measurement position and the time period in which the sensor unit is stored in the frame, the actuators are not energized. Thus, an energy-saving photosensor device having high actuation reliability can be obtained.

Advantageous Effects of Invention

The photosensor device of the present invention employs a system in which the sensor unit approaches the display screen of the image display panel by performing rotation operations in the multiple directions. Thus, even when the width and thickness of the bezel are reduced, it can cause the sensor unit to smoothly exit and enter the bezel, compared to photosensor devices of the conventional systems. According to the present invention, by performing the first rotation operation, a position close to the center, of the image display panel rather than a peripheral position thereof is easily used as the measurement region of the sensor. Also, by performing the second rotation operation, an optical property of the display screen, such as the luminance or chromaticity, is easily accurately measured using the sensor in such a manner that the sensor is less likely to be affected by ambient external light. According to the present invention, the single type of drive means allows the sensor unit to easily perform the first and second rotation operations.

The present invention provides a novel image display device that even when the width and thickness of a bezel disposed on the image display panel device are reduced, can easily contain a sensor unit and in which, to make a measurement, the sensor unit moves from within the bezel to the measurement region, approaches the display screen, and accurately makes a measurement using a photosensor in such a manner that the photosensor is less likely to be affected by ambient external light; after the measurement, the sensor unit leaves the display screen without applying unnecessary force to the image display panel and is stored in the bezel.

BRIEF DESCRIPTION OF THE DRAWINGS

FIGS. 1A and 1B include perspective views illustrating an image display device including a photosensor device of a first embodiment of the present invention. FIG. 1A shows a state in which a sensor unit is outside a bezel and on the screen; and FIG. 1B shows a state in which the sensor unit is stored in the bezel.

FIG. 2A is a rear view seen from the screen side (inside); FIG. 2B is a side view; and FIG. 2C is a front view seen from the bezel side (outside).

FIG. 3A is a rear view seen from the screen side (inside); FIG. 3B is a side view; and FIG. 3C is a front view seen from the bezel side (outside).

FIGS. 4A and 4B include diagrams showing the relationship between a holding member and a shaft in the sensor unit of the above embodiment. FIG. 4A is a diagram when the shaft is seen from a side; and FIG. 4B is a diagram when the shaft is seen from above.

FIGS. 5A to 5D include sectional views schematically showing the relationship between the sensor unit of the above embodiment and the display screen of an image display panel. FIG. 5A is a diagram showing a state in which the sensor unit has just performed a first rotation operation and thus exited the bezel; FIG. 5B is a diagram showing a state in which the sensor unit has just performed a second rotation operation and thus approached the display screen; FIG. 5C is a diagram showing a state in which the sensor unit has just performed a second rotation operation and thus left the display screen; and FIG. 5D is a diagram showing a state in which the sensor unit has just performed a first rotation operation and thus returned to the bezel.

FIGS. 6A and 6B include diagrams showing an operation performed by an arm when the sensor unit of the above embodiment is contained in the bezel. FIG. 6A is a diagram seen from the screen side (inside) and FIG. 6B is a diagram seen from the bezel side (outside).

FIG. 7A is a diagram seen from the screen side (inside) and FIG. 7B is a diagram seen from the bezel side (outside).

FIGS. 9A to 9D include sectional views schematically showing the relationship between a sensor unit of a second embodiment of the present invention and the display screen of an image display panel. FIG. 9A is a diagram showing a state in which the sensor unit has just performed a first rotation operation and thus exited a bezel; FIG. 9B is a diagram showing a state in which the sensor unit has just performed a second rotation operation and thus approached the display screen; FIG. 9C is a diagram showing a state in which the sensor unit has just performed a second rotation operation and thus left the display screen; and FIG. 9D is a diagram showing a state in which the sensor unit has just performed a first rotation operation and thus returned to the bezel.

FIG. 10 is a front view illustrating the disposition and configuration of a known photosensor unit in an image display device.

DESCRIPTION OF EMBODIMENTS

Figure 2A:
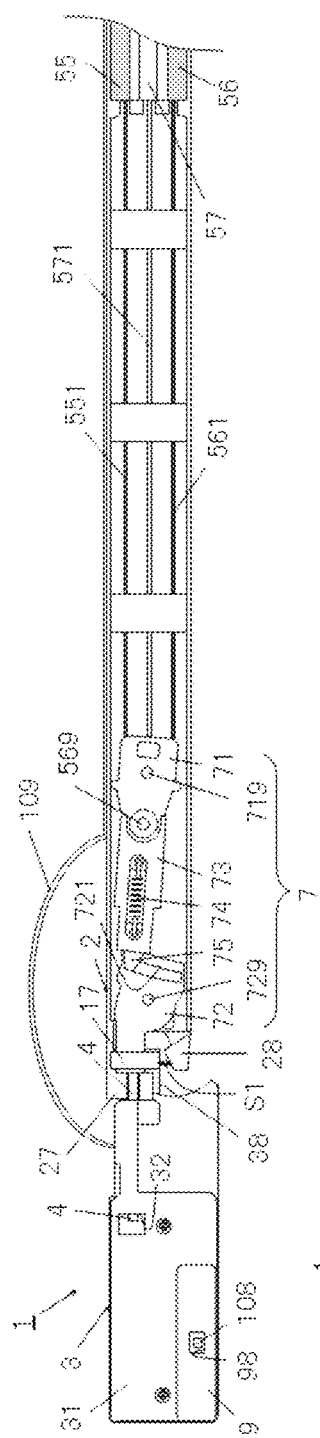
FIGS. 2A to 2C include structure diagrams showing a photosensor device of an embodiment of the present invention and showing a state in which a sensor unit is stored in a bezel.

Now, specific embodiments of the present invention will be described with reference to the drawings.

FIG. 1 shows a perspective view illustrating a liquid crystal display device 100 including a photosensor device 1 of an embodiment of the present invention. The photosensor device 1 of the present embodiment is integrated into a bezel 20 around a monitor screen (a liquid crystal display panel) 101 of the liquid crystal display device (a liquid crystal monitor) 100. A sensor unit 3 is a small, flat (stick-shaped) unit for measuring the luminance, chromaticity, or the like on a display screen 101a of the liquid crystal display panel. The photosensor device 1 of the present embodiment calibrates the liquid crystal panel 101 at predetermined time intervals as follows: to make a measurement, the photosensor device 1 causes the sensor unit 3 to perform a first rotation operation within the bezel 20 in a direction 4a so that the sensor unit 3 exits the bezel 20 and then to perform a second rotation operation in a direction 4b so that the sensor unit 3 approaches the measurement position on the liquid crystal panel 101 [FIG. 1A], and then makes a measurement using the photosensor of the sensor unit 3; and after the measurement, the photosensor device 1 causes the sensor unit 3 to perform a second rotation operation in a direction 4c so that the sensor unit 3 leaves the measurement position on the liquid crystal panel 101 and then to perform a first rotation operation in a direction 4d so that the sensor unit 3 is stored in the bezel 20 [FIG. 1B]. The direction 4a is a direction in which the sensor unit 3 moves to the measurement region approximately in parallel with the liquid crystal display panel while performing a first rotation operation; the direction 4b is a direction in which the sensor unit 3 approaches the display screen 101a of the liquid crystal panel while performing a second rotation operation; the direction 4c is a direction in which the sensor unit 3 leaves the display screen 101a of the liquid crystal panel while performing a second rotation operation; and the direction 4d is a direction in which the sensor unit 3 moves to the bezel approximately in parallel with the liquid crystal display panel while performing a first rotation operation.

In the example shown in FIG. 1, the liquid crystal panel 101 is in landscape orientation, and the sensor unit 3 is disposed near over the center of the bezel 20. However, the sensor unit 3 may be disposed in any position around the liquid crystal panel 101 as long as the position falls within the frame region of the liquid crystal panel 101. Further, the photosensor device 1 of the present invention may be attached to an existing image display device.

First Embodiment

Figure 2B:
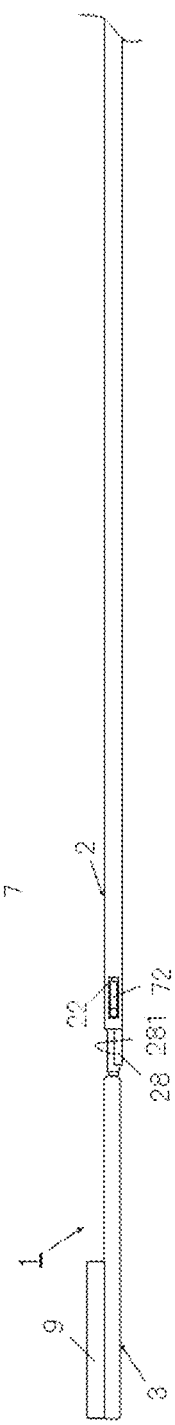
Figure 2C:
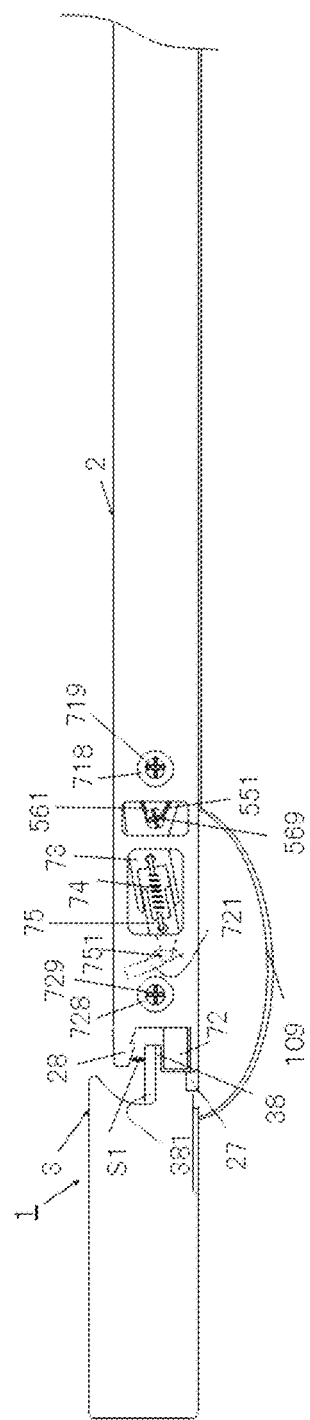
Figure 3A:
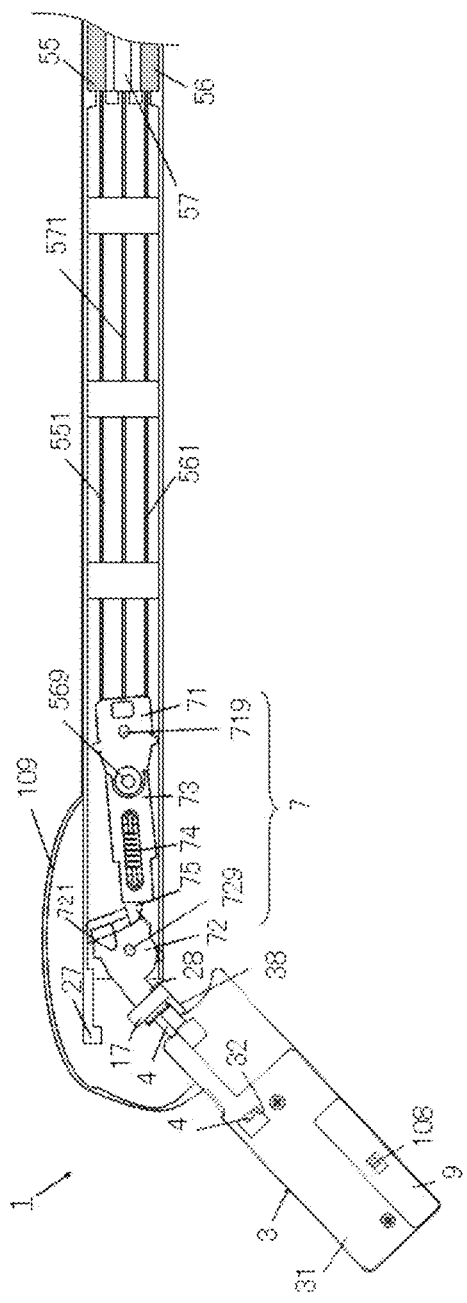
FIGS. 3A to 3C include structure diagrams showing a photosensor device of an embodiment of the present invention and showing a state in which a sensor unit is outside a bezel and on the measurement region.
Figure 3B:
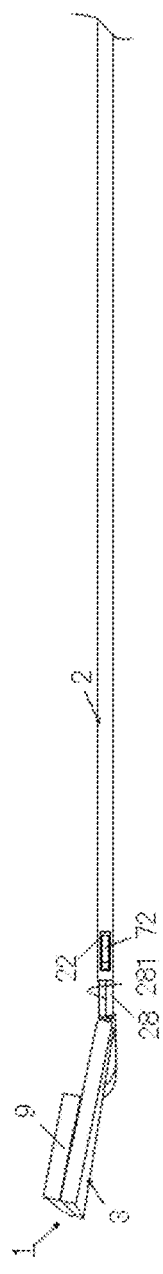
Figure 3C:
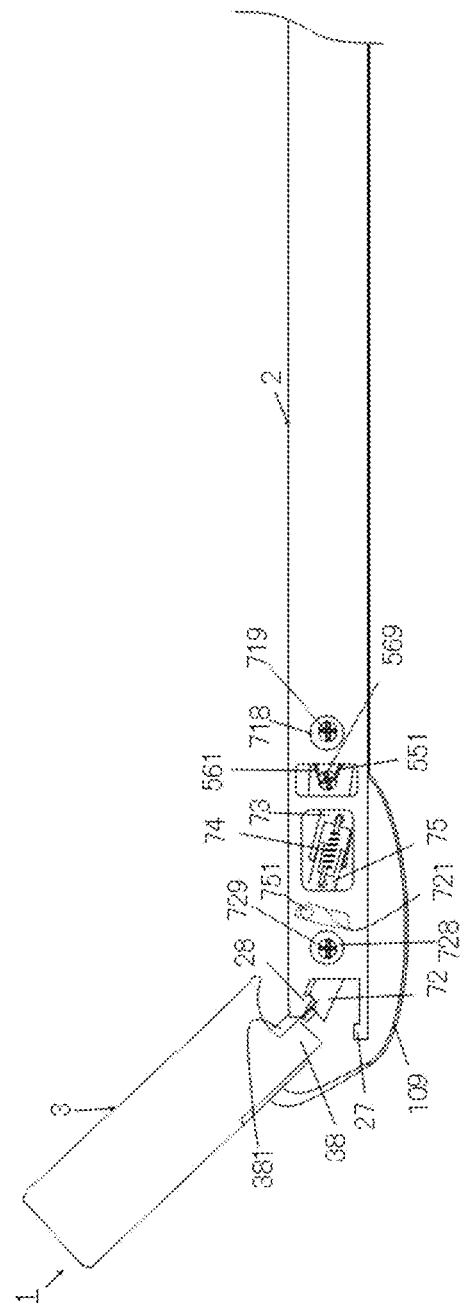

FIGS. 2 and 3 are structure diagrams illustrating a photosensor device 1 of a first embodiment of the present invention. FIG. 2 includes diagrams showing a state in which a sensor unit 3 is stored in a bezel, in which FIG. 2A is a rear view seen from the screen side (inside); FIG. 2B is a side view; and FIG. 2C is a front view seen from the bezel side (outside). FIG. 3 includes diagrams showing a state in which the sensor unit 3 has just moved from within the bezel to the measurement region, in which FIG. 3A is a rear view seen from the screen side (inside); FIG. 3B is a side view; and FIG. 3C is a front view seen from the bezel side (outside). As used herein, the term "a rear view seen from inside" refers to a diagram when seeing the user from the display screen 101a of the liquid crystal display panel, and the term "a front view seen from outside" is a diagram when seeing the display screen 101a of the liquid crystal display panel from the user.

The photosensor device 1 of the present embodiment includes a body frame 2 disposed in the frame region around the image display panel, a photosensor 108 used to measure the luminance, chromaticity, or the like of the image display panel, the sensor unit 3 containing a photosensor 108, a guide member 28 that guides the sensor unit 3, and drive means that moves the sensor unit 3 to the measurement position (FIGS. 2, 3). For the purpose of storing the photosensor device 1 of the present embodiment in the bezel 20, the sensor unit 3 is formed in a long quadrangular and flat shape, and the body frame 2 is also formed in a long quadrangular and flat shape (FIGS. 1 to 3). The sensor unit 3 and body frame 2 are coupled through a shaft 4 (FIGS. 2, 3). The shape of the sensor unit 3 is illustrative only and may be changed to any shape in consideration of the design. Instead of the above shape, the sensor unit 3 may be formed in, for example, a star shape, a polygonal shape, a heart shape, or circular shape.

In the present embodiment, the guide member 28 that guides the sensor unit 3 is integral with the side adjacent to the sensor unit, of the body frame 2. A slide member 38 that slides along the guide member 28 is integral with the side adjacent to the body frame, of the sensor unit 3 (FIGS. 2, 3). The side adjacent to the body frame, of the sensor unit 3 is notched into an arc shape so that the members other than the slide member 38 do not contact the guide member 28. The guide member 28 has a first slope 281, and the slide member 38 has a second slope 381. Accordingly, the slide member 38 slides with the first slope 281 and second slope 381 facing each other (FIGS. 2, 3, 5). The shape of the side adjacent to the body frame, of the sensor unit 3 is illustrative only and may be changed to any shape in consideration of the design. For example, instead of the above shape, the shape of the side adjacent to the body frame, of the sensor unit 3 may be notched into a triangular, quadrangular, or polygonal shape.

In the present embodiment, a plate spring 17 is mounted on the surface opposite to the second slope 381, of the slide member 38 so as to face the body frame 2 (FIGS. 2, 3, 5). The plate spring 17 is formed by press-molding a metal sheet and is fixed by fixing means, such as a screw. In the present embodiment, the plate spring 17 is configured to move with the sensor unit 3 in such a manner that the plate spring 17 does not contact a flexible flat cable 109. In the present embodiment, during the storage of the sensor unit 3 in the bezel 20, the plate spring 17 reverses the rotation until the sensor unit 3 is stored in the bezel 20. Thus, the sensor unit 3 performs a rotation operation stably. The plate spring 17 may be disposed and configured in any manner and, for example, may be mounted on the body frame 2 in such a manner that the slide member 38 contacts the guide member 28. Instead of the plate spring 17, a disc spring, torsion spring, or coil spring may be used, or an elastic member such as rubber may be used.

The photosensor 108 is mounted on a substrate (not shown) in the sensor unit 3 (see FIGS. 2, 3, 5) and is used to measure the luminance, chromaticity, or the like of the liquid crystal display panel 101. The photosensor 108 is connected to a control substrate (not shown) of the main body of the liquid crystal display device 100 through the flexible flat cable 109 drawn from the rear surface of the sensor unit 3. When a personal computer or software installed in the liquid crystal display device is started, an optical property of the liquid crystal panel 101, such as the luminance, chromaticity, or light amount, is measured using the photosensor 108 included in the sensor unit 3, and monitor calibration is performed on the basis of the measurement data obtained.

In the present embodiment, the light receiving part of the photosensor 108 is previously provided with an infrared ray (IR) filter so as to prevent the entry of external light into the photosensor 108. The sensor unit 3 has a rectangular window hole for light reception on the surface thereof adjacent to the display screen 101a. In the present embodiment, a flat shading member (a cushion member) 9 is affixed and fastened to the surface adjacent to the display screen 101a, of the sensor unit 3 using adhesive means, such as a double-sided tape or adhesive (FIG. 2, 3, 5). The shading member 9 is rectangular, surrounds the photosensor 108, and has a quadrangular lighting window 98 so that light from the display screen 101a is received by the photosensor 108. The lighting window 98 is formed by hollowing the center of the shading member 9. The lighting window 98 may be a round window or a polygonal window, such as a hexagon window or octagonal window.

In the present embodiment, the lighting window 98 of the sensor unit 3 is preferably disposed in a position such that when a second rotation operation is complete, the surface of the lighting window 98 and the display screen 101a of the image display panel becomes parallel with each other. The reason is that the state in which the surface of the lighting window 98 and the display screen 101a of the image display panel are parallel with and close to each other is most suitable for lighting.

Examples of the shading member 9 include paper, resin sheets, flock paper, flock sheets, felt, sponge, rubber, and elastomers. Flock paper or flock sheet is particularly preferable as the shading member 9 of the present embodiment. The reason is that flock paper or flock sheet has high absorbance and cushioning characteristics, as well as slidability and therefore can reduce the load on the image display panel 101 and block light effectively.

FIG. 4 is a diagram showing the relationship between a metal sheet 31 and the shaft 4 in the sensor unit 3. FIG. 4A is a diagram when the shaft 4 is seen from a side, and FIG. 4B is a diagram when the shaft 4 is seen from above. The shaft 4 has an outer circumferential groove 41 near an end thereof [FIGS. 4A and 4B]. The metal sheet 31 is obtained by press-molding a metal sheet for shielding the photosensor 108, and a notch of a holding member 32 obtained by partially bending the metal sheet 31 is fitted into the outer circumferential groove 41 of shaft 4 so as to easily slide. Thus, the shaft 4 is rotatably held by the holding member 32 [FIGS. 4A and 4B]. As seen above, according to the present embodiment, the part of the shielding metal sheet 31 serves as the holding member 32. Thus, it is possible to reduce the number of components and to simplify the structure of the sensor unit 3.

In the present embodiment, a predetermined clearance S1 is provided between the sensor unit 3 and guide member 28 in the initial state [FIGS. 2A and 2C]. The timing when a first rotation operation is changed to a second rotation operation is set on the basis of the size of the clearance S1. Specifically, the sensor unit 3 performs a second rotation operation only after exiting the bezel 20. Thus, the sensor unit 3 performing a first rotation operation is prevented from contacting the bezel 20. In the present embodiment, the sensor unit 3 is configured to perform a second rotation operation at the timing when it completes a first rotation operation.

As shown in FIGS. 2, 3, and the like, an arm 7 for operating the shaft 4 is disposed on the body frame 2. The arm 7 consists of a first arm 71 and a second arm 72 which are coupled together (FIGS. 2, 3, 6, 7). In the present embodiment, a first shape-memory alloy wire 551 and a second shape-memory alloy wire 561 serve as drive means. The drive means rotates the first arm 71, which then rotates the second arm 72, which in turn causes the shaft 4 fixed to the second arm 72 to perform a first rotation operation (FIGS. 2, 3, 6, 7). Details of the structure of the arm 7 will be described later.

FIG. 5 includes sectional views schematically showing the relationship between the sensor unit 3 and the display screen 101a of the image display panel. FIG. 5A is a diagram showing a state in which the sensor unit 3 has just performed a first rotation operation in the direction 4a and thus exited the bezel 20; FIG. 5B is a diagram showing a state in which the sensor unit 3 has just performed a second rotation operation in the direction 4b and thus approached the display screen 101a; FIG. 5C is a diagram showing a state in which the sensor unit 3 has just performed a second rotation operation in the direction 4c and thus left the display screen 101a; and FIG. 5D is a diagram showing a state in which the sensor unit 3 has just performed a first rotation operation in the direction 4d and thus returned to the bezel 20. In the following description, it is assumed that the side adjacent to the display screen 101a, of the bezel 20 (the right side in FIG. 5) is the front side and that the side remote from the display screen 101a, of the bezel 20 (the left side in FIG. 5) is the rear side.

In the present embodiment, the guide member 28 has the first slope 281 on the front side thereof, and the slide member 38 has the second slope 381 on the rear side thereof (FIG. 5). In the initial state, in which the sensor unit 3 is stored in the bezel 20, the predetermined clearance S1 is provided between the slide member 38 and guide member 28 [see FIGS. 2A and 5D]. The arm 7 causes the shaft 4 to perform a first rotation operation in parallel with the display screen 101a. Through the shaft 4, the sensor unit 3 performs a first rotation operation in the direction 4a and thus exits the bezel 20. At this time, the sensor unit 3 performs the first rotation operation approximately in parallel with the display screen 101a until it is guided by the guide member 28 [FIG. 5A]. Then, the slide member 38 slides with the second slope 381 of the slide member 38 and the first slope 281 of the guide member 28 facing each other. Thus, the operation of the shaft 4 is changed from the first rotation operation to a second rotation operation which is perpendicular to the display screen 101a. At the same time, the operation of the sensor unit 3 is also changed from the first rotation operation to a second rotation operation. That is, the sensor unit 3 performs a second rotation operation in the direction 4b and thus approaches the display screen 101a [FIG. 5B]. In the present embodiment, while the slide member 38 slides, the plate spring 17 is causing the first slope 281 and second slope 381 to contact each other. The shading member 9 is brought into approximately intimate contact with the display screen 101a by a predetermined pressing force [FIG. 5B]. Then, the sensor unit 3 measures an optical property using the photosensor 108 while producing excellent shading effects, as well as following variations in the position caused by the drive heating of the image display panel 101. After making the measurement using the photosensor 108, the slide member 38 slides with the first slope 281 and second slope 381 facing each other. Thus, the sensor unit 3 performs a second rotation operation in the direction 4c and thus leaves the display screen 101a [FIG. 5C]. The sensor unit 3 then performs a first rotation operation in the direction 4d and thus is stored in the bezel 20 [FIG. 5D]. At this time, the plate spring 17 reverses the rotation until the sensor unit 3 is stored in the bezel 20. In this way, the sensor unit 3 performs the rotation operation stably.

Figure 7A:
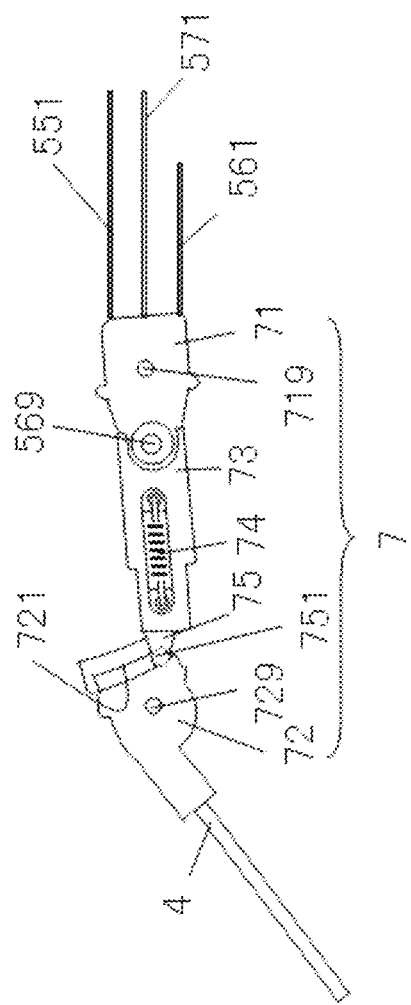
FIGS. 7A and 7B include diagrams showing an operation performed by the arm when the sensor unit of the above embodiment has just performed a first rotation operation and thus exited the bezel.
Figure 7B:
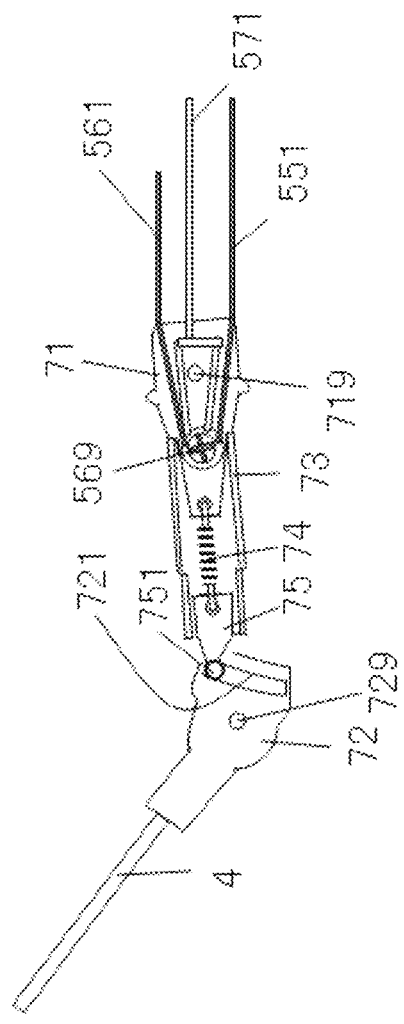

FIG. 6 includes diagrams showing an operation performed by the arm 7 when the sensor unit 3 of the present embodiment is contained in the bezel 20. FIG. 6A is a diagram seen from the screen side (inside), and FIG. 6B is a diagram seen from the bezel side (outside). FIG. 7 includes diagrams showing an operation performed by the arm 7 when the sensor unit 3 of the present embodiment has just performed the first rotation operation and thus exited the bezel 20. FIG. 7A is a diagram seen from the screen side (inside), and FIG. 7B is a diagram seen from the bezel side (outside).

In the present embodiment, the first shape-memory alloy wire 551 and second shape-memory alloy wire 561 serve as drive means, and the single type of drive means rotates the first arm 71, which then rotates the second 72, which in turn causes the shaft 4 fixed to the second arm 72 to perform a first rotation operation (FIGS. 2, 3, 6, 7). The first shape-memory alloy wire 551 and second shape-memory alloy wire 561 are formed of the same material, have the same diameter, and are fixed by a fixing screw 569 and electrically connected to an electrode wire 571 [FIGS. 6B and 7B]. Alternatively, a first shape-memory alloy wire 551 and a second shape-memory alloy wire 561 obtained by folding and fixing a single wire using a fixing screw 569 may be used. FIGS. 2A and 3B also show electrode terminals 55, 56, and 57 for applying a DC voltage.

In the present embodiment, the body frame 2 has a quadrangular groove 22 (may be a recess) on a side surface thereof [see FIGS. 2B and 3B]. The groove 22 serves as a clearance hole for fully using the width of the movable stroke. The second arm 72 is mounted on the body frame 2 using a flat washer 728 and a screw 729 [FIGS. 2C and 3C] and is rotatably supported by the body frame 2 with the screw 729 used as the rotation axis (the rotation center) [see FIGS. 6A and 7A]. The first arm 71 is mounted on the body frame 2 using a flat washer 718 and a screw 719, and the screw 719 fixes the flat washer 718 so that the first arm 71 does not come off [see FIGS. 2C and 3C]. The first arm 71 is rotatably supported by a rotary shaft (the rotation center) molded integrally with the main body [see FIGS. 6A and 7A].

In the present embodiment, the first arm 71 and second arm 72 are coupled by a slider 73 in such a manner that these arms operate in an interlocked manner [FIGS. 6A, 6B, 7A, 7B]. The first arm 71 has the first shape-memory alloy wire 551, second shape-memory alloy wire 561, and flexible wire 571 disposed on the rear end thereof. The first arm 71 also has the rear end of the slider 73 mounted on the front end thereof. A slide member 75 of the slider 73 and the front end of the first arm 71 are coupled through a tension spring 74. The shaft 4 is fixed to the front end of the second arm 72. The second arm 72 has an arc-shaped slide groove 721 in the rear end thereof. A slide pin 751 of the slide member 75 is mounted on the slide groove 721 of the second arm 72 so as to easily slide [FIGS. 6A, 6B, 7A, 7B]. The center of the slide groove 721 serves as a peak, and the second arm 72 operates at the time point when the slide pin 751 goes beyond the peak. In the present embodiment, the first arm 71, slide pin 751, and second arm 72 are coupled together in such a manner that an operation of the first arm 71 causes an operation of the slide pin 751, which then causes an operation of the second arm 72 with a delay. When the set of shape-memory alloy wires 551 and 561, first arm 71, slider 73, second arm 72, shaft 4, and sensor unit 3 are interlocked with each other, the second shape-memory alloy wire 561 contracts. Thus, the sensor unit 3 performs a first rotation operation in the direction 4a [FIG. 5A] and then performs a second rotation operation in the direction 4b. Due to the second rotation operation, the sensor unit 3 moves obliquely toward the display screen 101a, so that the shading member 9 contacts the display screen 101a [FIG. 5B]. FIG. 7A shows that the second shape-memory alloy wire 561 has contracted horizontally compared to that in FIG. 6A. After a measurement, the first shape-memory alloy wire 551 contracts and thus the sensor unit 3 performs a second rotation operation in the direction 4c, thereby retreating obliquely and leaving the display screen 101a [FIG. 5C]. The sensor unit 3 then performs a first rotation operation in the direction 4d and thus is stored in the bezel 20 [FIG. 5D]. FIG. 7A shows that the first shape-memory alloy wire 551 has contracted horizontally compared to that in FIG. 6A. Note that the slide groove 721 may have a shape other than the arc shape and, for example, may have a shape connected by a horizontally symmetrical straight line having the center as a peak.

The body frame of the slider 73 is obtained by press-molding a metal sheet member. The plastic slide member 75 is inserted in the body frame of the slider 73 and is configured to horizontally move in a predetermined range [FIGS. 6A, 6B, 7A, 7B]. The plastic first arm 71 is also inserted in the body frame of the slider 73 and is configured to horizontally move in a predetermined range. The slide pin 751 is inserted in the long groove 721 of the plastic second arm 72, and the shaft 4 is configured to perform a first rotation operation in a predetermined range [FIGS. 6A, 6B, 7A, 7B].

FIGS. 6B and 7B illustrate the disposition and configuration of the first arm 71, first shape-memory alloy wire 551, and second shape-memory alloy wire 561. Ends of the first and second shape-memory alloy wires 551 and 561 are fixed and electrically connected together by the screw 569. In practice, by fixing and electrically connecting a single shape-memory alloy wire at the midpoint thereof using a screw 569 and causing the wire to serve as first and second shape-memory alloy wires 551 and 561, the assembly work is simplified and streamlined. The flexible wire 571 is electrically connected to a portion under the screw 569 so as to energize the shape-memory alloy wires. The shape-memory alloy wires 551 and 561 and the flexible wire 571 may be fixed and connected using any method, as long as these wires can be firmly fixed and reliably electrically connected. Applicable methods include soldering, brazing, screw fixation, swaging, and press/contact fixation.

The shape-memory alloy wires 551 and 561 of the present embodiment have no polarity. For this reason, the shape-memory alloy wire 551 and flexible wire 571 are actuated, regardless of which of the first shape-memory alloy wire 551 and flexible wire 571 a positive DC voltage is applied to. Similarly, the shape-memory alloy wire 561 and flexible wire 571 are actuated, regardless of which of the shape-memory alloy wire 561 and flexible wire 571 a positive DC voltage is applied to.

When a predetermined switch (hereafter referred to as a switch A) is turned on to energize the second shape-memory alloy wire 561, the second shape-memory alloy wire 561 contracts against the tensile force of the return spring 74. Thus, as described above, the sensor unit 3 performs a first rotation operation in the direction 4a and then performs a second rotation operation in the direction 4b, allowing the photosensor 108 to measure the luminance, chromaticity, or the like of the monitor screen 101 [FIG. 5B]. At the time point when the sensor unit 3 reaches the measurement position, the switch A is turned off, and the second shape-memory alloy wire 561 cools down due to heat dissipation and restores its original length.

After the photosensor 108 measures the luminance, chromaticity, or the like of the monitor screen 101, a predetermined switch (hereafter referred to as a switch B) is turned on to energize the first shape-memory alloy wire 551. Thus, the shape-memory alloy wire 551 contracts against the tensile force of the return spring 74, and, as described above, the sensor unit 3 performs a second rotation operation in the direction 4c and then performs a first rotation operation in the direction 4d and thus is stored in the bezel 20 [FIG. 5D]. At the time point when the sensor unit 3 is stored, the switch B is turned off, and the first shape-memory alloy wire 551 cools down due to heat dissipation and thus restores its original length.

In the present embodiment, the shape-memory alloy wires (the first shape-memory alloy wire 551, second shape-memory alloy wire 561) do not directly drive the sensor unit 3. For this reason, even when the shape-memory alloy wires 551 and 561 are affected by the dissipation from the display screen 101, the slide pin 751 of the slide member 75 does not move from one side of the center of the arc-shaped long groove 721 of the second arm 72 to the other side, as described above, until these shape-memory alloy wires contract to some degree. The sensor unit 3 does not start to move until that time. Accordingly, the sensor unit 3 is less likely to malfunction due to heat. Specifically, in the actual liquid crystal monitor 1, the temperature around the monitor screen 101 may increase from room temperature to around 50° C., and the shape-memory alloy wires (the first shape-memory alloy wire 551 and second shape-memory alloy wire 561) are more likely to be affected by heat and therefore may not expand smoothly in a short time after stopping the energization thereof. In the present embodiment, when the temperature is high, the energized shape-memory alloy wire forcefully pulls the other shape-memory alloy wire, which is not fully expanded, by the contraction force thereof and thus rotates the first arm 71. As a result, the sensor unit 3 operates stably. Also, in the present embodiment, shape-memory alloy wires that when energized, generate sufficiently higher Joule heat than the temperature around the monitor screen 101 are selected as the shape-memory alloy wires 551 and 561. More specifically, shape-memory alloy wires which contract at a temperature of about 70° C. and expand at a temperature of about 60° C. are used. Also, the return spring 74 is a single spring and therefore it is relatively easy to select shape-memory alloy wires whose diameter contracts against the tensile force of the return spring with room. For example, shape-memory alloy wires having a diameter of about 0.25 mm are used as the shape-memory alloy wires 551 and 561. Further, the shape-memory alloy wires 551 and 561 are not energized while the sensor unit 3 is held in the measurement position or while the sensor unit 3 is back in its original position. For these reasons, the photosensor device 1 can be said to be an energy-saving and operation-reliable photosensor device.

Figure 8:
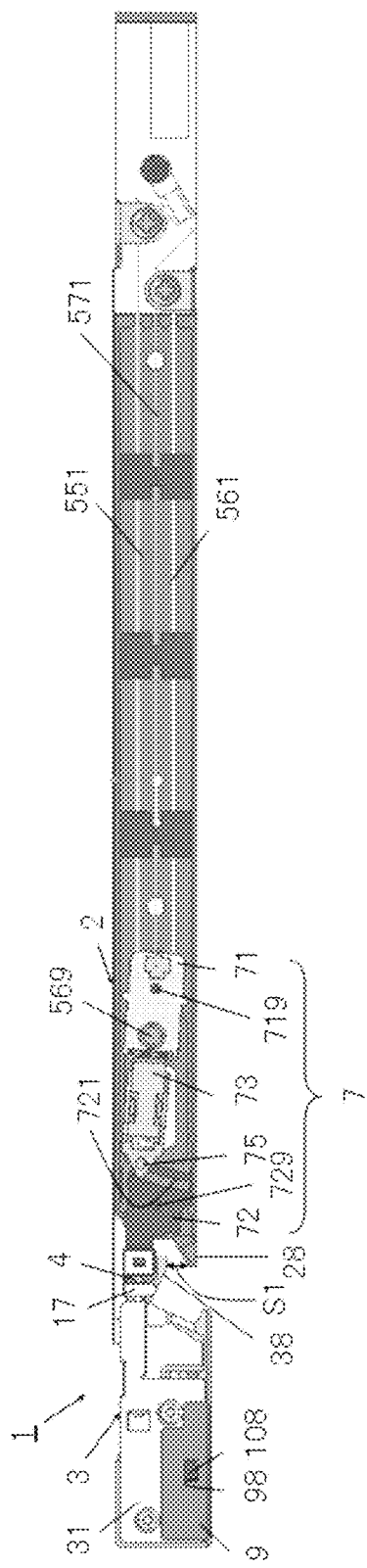
FIG. 8 is a structure diagram showing another example of the photosensor device of the first embodiment of the present embodiment, is also a diagram showing a state in which the sensor unit is stored in the bezel, and is also a rear view seen from the screen side (inside).

FIG. 8 is a structure diagram showing another example of the photosensor device of the first embodiment of the present embodiment, is also a diagram showing a state in which a sensor unit 3 is stored in a bezel, and is also a rear view seen from the screen side (inside). In the example shown in FIG. 8, a larger clearance S1 is provided between a guide member 28 and a slide member 38 and therefore the swing area of a first rotation operation is larger. Also, in the example shown in FIG. 8, a first shape-memory alloy wire 551 is longer than a second shape-memory alloy wire 561.

In the present embodiment, the positions in which the shape-memory alloy wires 551 and 561 are fixed by screws are closer to each other. Thus, the wires are empirically less likely to be broken.

Second Embodiment

FIG. 9 includes sectional views schematically showing the relationship between a sensor unit of a second embodiment of the present invention and the display screen of an image display panel. FIG. 9A is a diagram showing a state in which the sensor unit has just performed a first rotation operation and thus exited a bezel; FIG. 9B is a diagram showing a state in which the sensor unit has just performed a second rotation operation and thus approached the display screen; FIG. 9C is a diagram showing a state in which the sensor unit has just performed a second rotation operation and thus left the display screen; and FIG. 9D is a diagram showing a state in which the sensor unit has just performed a first rotation operation and thus returned to the bezel. In the present embodiment, the same reference signs as those in the first embodiment denote the same functions and therefore description thereof will be omitted as appropriate.

In the present embodiment, one end of an optical fiber 401 is fitted into a lighting window 98 of a sensor unit 3, and the other end of the optical fiber 401 is in contact with a photosensor 108 contained in the sensor unit 3 [FIGS. 9A, 9B, 9C, 9D]. The photosensor 108 does not face the lighting window 98 and is contained in, for example, a portion close to a body frame 2, of the sensor unit 3. According to the present embodiment, the photosensor 108 and lighting window 98 are displaced from each other by utilizing the flexibility of the optical fiber 401. Thus, light leaking from the lighting window 98 is less likely to enter the photosensor 108.

In the present embodiment, the lighting window 98 of the sensor unit 3 is disposed in a position such that when a second rotation operation is complete, the surface of the lighting window 98 and a display screen 101 of the image display panel become parallel with each other [see FIG. 9B].

The present invention is not limited to the above embodiments. For example, the actuators 551 and 561 need not have a wire shape and may have any shape, including flat, coiled, spiral, cylindrical, and prismatic shapes, as long as they are actuators which contract against the resilience of the spring member when energized. The drive means of the present invention need not be the shape-memory alloy wires 551 and 561 and may be a small motor, a solenoid, or the like. For example, by combining a wire, a pulley, and a motor (or solenoid) together and winding the wire about the pulley so that the wire apparently contracts or unwinding the wire from the pulley so that the wire apparently expands, the wire can work as do the shape-memory alloy wires 551 and 561. Also, the sensor unit 3 may be caused to perform rotation operations in multiple directions by mounting a screw mechanism in place of the arm 7 and pulling a screw using a wire.

While, in the above embodiments, the photosensor 108 is contained in the sensor unit 3, other configurations may be used. For example, the photosensor 108 may be contained in the body frame. In this case, for example, light from the lighting window may be indirectly detected by inserting one end of an optical fiber or a light guide formed of a transparent resin or glass into the lighting window and contacting the other end of the optical fiber or light guide with the photosensor.

The disposition or the like of the sensor unit 3 may be changed freely. For example, multiple sensor units 3 may be disposed. If the shape-memory alloy wires 551 and 561 are used as the actuators, any of direct current and alternating current may be passed through the actuators. The photosensor device 1 of the present invention may be incorporated into a monitor being assembled, or may be incorporated into an assembled monitor. A major feature of the present invention is that even when the size of the monitor screen is increased, the sensor unit 3 can easily measure the center of the monitor screen by only increasing the length of the shaft 4. The present invention can be used with image display monitors, such as liquid crystal, organic EL, and plasma display monitors. The present invention can also be used to measure physical quantities of other types of display monitors, as long as the display monitors include a bezel 20 disposed in the frame region around the object to be measured and a sensor unit 3 including an photosensor 108 for measuring physical quantities of the object to be measured. Changes can be made to the present invention as appropriate without departing from the spirit and scope of the invention, as a matter of course.

REFERENCE SIGNS LIST

1 photosensor device
2 body frame
3 sensor unit
4 control shaft (shaft)
4*a*, 4*b* first rotation operation direction
4*b*, 4*c* second rotation operation direction
7 arm 7
71 first arm
72 second arm
73 slider
74 return spring
9 shading member
17 plate spring
20 bezel
28 guide member
38 slide member
98 lighting window
100 image display device (liquid crystal display device)
101 image display panel (liquid crystal screen)
108 photosensor
281, 381 slope
551, 561 actuator (shape-memory alloy wire)
729 rotation shaft perpendicular to control shaft 4 (screw)

The invention claimed is:

1. A photosensor device comprising:
a body frame disposed in a frame region around an image display panel;
a photosensor used to measure luminance and/or chromaticity of the image display panel;
a sensor unit for causing the photosensor to receive light;
a guide member that guides the sensor unit and is provided on the body frame, the guide member being provided adjacent to the sensor unit drive means configured to move the sensor unit,
wherein
the sensor unit moves to a measurement region on a display screen of the image display panel by performing a first rotation of the sensor unit until the sensor unit is guided by the guide member, wherein after the sensor unit is guided by the guide member,
the sensor unit approaches the display screen by performing a second rotation of the sensor unit in a direction perpendicular to a direction of the first rotation operation.

2. A photosensor device comprising:

a body frame disposed in a frame region around an image display panel;

a photosensor used to measure luminance and/or chromaticity of the image display panel;

a sensor unit for causing the photosensor to receive light;

a guide member that guides the sensor unit and is provided on the body frame, the guide member being provided adjacent to the sensor unit; and drive means configured to move the sensor unit, wherein the sensor unit and the drive means are coupled through a shaft, the shaft being disposed parallel to the body frame, the shaft performs a first rotation of the sensor unit in parallel with a display screen of the image display and on a plane parallel to the body frame, and then performs a second rotation of the sensor unit perpendicularly to the display screen.

3. The photosensor device of claim 2, wherein the shaft and the drive means are coupled through a plurality of arms.

4. The photosensor device of claim 1, comprising:

a slide member configured to be slidable along the guide member, the slide member being provided on side adjacent to the body frame of the sensor unit, wherein the guide member has a first slope, the slide member has a second slope, wherein the slide member slides along the guide member with the first slope and second slope facing each other.

5. The photosensor device of claim 2, comprising:

a slide member configured to be slidable along the guide member, the slide member being provided on side adjacent to the body frame of the sensor unit, wherein the guide member has a first slope, the slide member has a second slope, wherein the slide member slides along the guide member with the first slope and second slope facing each other.

6. The photosensor device of claim 1, wherein the photosensor is contained in the sensor unit, the sensor unit has, on a side thereof facing the display screen, a lighting window for causing the photosensor to receive light and a shading member surrounding the lighting window, formed by a cushion member having a hollow center and disposed in such a manner that light from the display screen is received by the photosensor, during a measurement, the shading member is in contact with the display screen of the image display panel, and after the measurement, the shading member leaves the display screen.

7. The photosensor device of claim 2, wherein the photosensor is contained in the sensor unit, the sensor unit has, on a side thereof facing the display screen, a lighting window for causing the photosensor to receive light and a shading member surrounding the lighting window, formed by a cushion member having a hollow center and disposed in such a manner that light from the display screen is received by the photosensor, during a measurement, the shading member is in contact with the display screen of the image display panel, and after the measurement, the shading member leaves the display screen.

8. An image display device, wherein the photosensor device of claim 1 is contained in a bezel around the image display panel.

9. An image display device, wherein the photosensor device of claim 2 is contained in a bezel around the image display panel.

* * * * *

UNITED STATES PATENT AND TRADEMARK OFFICE
CERTIFICATE OF CORRECTION

PATENT NO. : 10,062,338 B2
APPLICATION NO. : 15/303795
DATED : August 28, 2018
INVENTOR(S) : Hidekazu Hogo Page 1 of 1

It is certified that error appears in the above-identified patent and that said Letters Patent is hereby corrected as shown below:

In the Claims

Column 16, Lines 48-67, Claim 1 should read as:
--1. A photosensor device comprising:
    a body frame disposed in a frame region around an image display panel;
    a photosensor used to measure luminance and/or chromaticity of the image display panel;
    a sensor unit for causing the photosensor to receive light;
    a guide member that guides the sensor unit and is provided on the body frame,
the guide member being provided adjacent to the sensor unit; and
    drive means configured to move the sensor unit,
    wherein
    the sensor unit moves to a measurement region on a display screen of the image display panel
by performing a first rotation of the sensor unit until the sensor unit is guided by the guide member,
wherein after the sensor unit is guided by the guide member,
    the sensor unit approaches the display screen by performing a second rotation of the sensor
unit in a direction perpendicular to a direction of the first rotation operation.--

Signed and Sealed this
Twenty-eighth Day of April, 2020

Andrei Iancu
*Director of the United States Patent and Trademark Office*